(12) United States Patent
Lou

(10) Patent No.: US 8,103,623 B2
(45) Date of Patent: Jan. 24, 2012

(54) METHOD FOR ACCESSING DATA STORED IN STORAGE MEDIUM OF ELECTRONIC DEVICE

(75) Inventor: Wenzhong Lou, Sunnyvale, CA (US)

(73) Assignee: Silicon Motion Inc., Jhubei, Hsinchu County (TW)

( * ) Notice: Subject to any disclaimer, the term of this patent is extended or adjusted under 35 U.S.C. 154(b) by 231 days.

(21) Appl. No.: 12/712,207

(22) Filed: Feb. 25, 2010

(65) Prior Publication Data

US 2011/0208693 A1 Aug. 25, 2011

(51) Int. Cl.
*G06F 17/30* (2006.01)
(52) U.S. Cl. .......................... 707/609; 707/692; 707/821
(58) Field of Classification Search .................. 707/609, 707/692, 821
See application file for complete search history.

(56) References Cited

U.S. PATENT DOCUMENTS

| | | | |
|---|---|---|---|
| 6,862,604 B1 * | 3/2005 | Spencer et al. | 707/802 |
| 7,168,064 B2 * | 1/2007 | Ousterhout et al. | 717/120 |
| 7,197,431 B2 * | 3/2007 | Barritz | 702/186 |
| 2003/0009484 A1 * | 1/2003 | Hamanaka et al. | 707/200 |
| 2008/0189710 A1 * | 8/2008 | Kalmuk et al. | 718/102 |
| 2011/0276772 A1 * | 11/2011 | Ohata | 711/162 |

\* cited by examiner

*Primary Examiner* — Cheryl Lewis
(74) *Attorney, Agent, or Firm* — Winston Hsu; Scott Margo

(57) ABSTRACT

A method for accessing data stored in a storage medium of an electronic device, where the storage medium stores a file-usage table having a plurality of file-usage data which correspond to a plurality of clusters of the storage medium, respectively, includes: when a file is stored into at least a specific cluster of the plurality of the clusters of the storage medium, modifying a specific file-usage data which corresponds to the specific cluster; and when the file is deleted from the storage medium, setting the specific file-usage data by a first predetermined value.

22 Claims, 12 Drawing Sheets

| Cluster_0 : System table |
|---|
| Cluster_1 : Data |
| Cluster_2 : Data |
| ⋮ |
| Cluster_1022 : Data |
| Cluster_1023 : Data |

FIG. 2

File-usage table

| | 00 01 | 02 03 | 04 05 | 06 07 | 08 09 | 0A 0B | 0C 0D | 0E 0F |
|---|---|---|---|---|---|---|---|---|
| 0000 | TFN | $D_{u1}$ | $D_{u2}$ | $D_{u3}$ | $D_{u4}$ | $D_{u5}$ | $D_{u6}$ | $D_{u7}$ |
| 0010 | $D_{u8}$ | $D_{u9}$ | $D_{u10}$ | $D_{u11}$ | $D_{u12}$ | $D_{u13}$ | $D_{u14}$ | $D_{u15}$ |
| 0012 | $D_{u16}$ | $D_{u17}$ | $D_{u18}$ | $D_{u19}$ | $D_{u20}$ | $D_{u21}$ | $D_{u22}$ | $D_{u23}$ |
| …… | | | | | | | | |
| 07E0 | $D_{u1010}$ | $D_{u1011}$ | $D_{u1012}$ | $D_{u1013}$ | $D_{u1014}$ | $D_{u1015}$ | $D_{u1014}$ | $D_{u15}$ |
| 07F0 | $D_{u1016}$ | $D_{u1017}$ | $D_{u1018}$ | $D_{u1019}$ | $D_{u1020}$ | $D_{u1021}$ | $D_{u1022}$ | $D_{u1023}$ |

FIG. 4

File-index table

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | | $D_{i1}$ | $D_{i2}$ | $D_{i3}$ | $D_{i4}$ | $D_{i5}$ | $D_{i6}$ | $D_{i7}$ | $D_{i8}$ | | | | | | | |
| 0010 | | $D_{i9}$ | $D_{i10}$ | $D_{i11}$ | $D_{i12}$ | $D_{i13}$ | $D_{i14}$ | $D_{i15}$ | $D_{i16}$ | | | | | | | |
| ...... | | | | | | | | | | | | | | | | |
| 07F0 | | $D_{i1017}$ | $D_{i1018}$ | $D_{i1019}$ | $D_{i1020}$ | $D_{i1021}$ | $D_{i1022}$ | $D_{i1023}$ | | | | | | | | |

FIG. 5

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | $D_{FN1}$ | | | | | | | | | | | | | | | |
| 0010 | $D_{FN2}$ | | | | | | | | | | | | | | | |
| 0020 | $D_{FN3}$ | | | | | | | | | | | | | | | |
| ...... | | | | | | | | | | | | | | | | |
| 3FD0 | $D_{FN1022}$ | | | | | | | | | | | | | | | |
| 3FE0 | $D_{FN1023}$ | | | | | | | | | | | | | | | |
| 3FF0 | | | | | | | | | | | | | | | | |

File-name table

FIG. 6

First file-property table

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | | | | | | | | $D_{FFP1}$ | | | | | | | | |
| 0010 | | | | | | | | $D_{FFP2}$ | | | | | | | | |
| 0020 | | | | | | | | $D_{FFP3}$ | | | | | | | | |
| ...... | | | | | | | | | | | | | | | | |
| 3FD0 | | | | | | | | $D_{FFP1022}$ | | | | | | | | |
| 3FE0 | | | | | | | | $D_{FFP1023}$ | | | | | | | | |
| 3FF0 | | | | | | | | | | | | | | | | |

FIG. 7

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000 | | | | | | | | $D_{SFP1}$ | | | | | | | | |
| 0010 | | | | | | | | $D_{SFP1}$ | | | | | | | | |
| ...... | | | | | | | | ...... | | | | | | | | |
| 01F0 | | | | | | | | $D_{SFP1}$ | | | | | | | | |
| 0200 | | | | | | | | $D_{SFP2}$ | | | | | | | | |
| ...... | | | | | | | | ...... | | | | | | | | |
| 03F0 | | | | | | | | $D_{SFP2}$ | | | | | | | | |
| ...... | | | | | | | | ...... | | | | | | | | |

Second file-property table

FIG. 8

METHOD FOR ACCESSING DATA STORED IN STORAGE MEDIUM OF ELECTRONIC DEVICE

BACKGROUND OF THE INVENTION

1. Field of the Invention

The present invention relates to a data accessing method, and more particularly, to a method for accessing data stored in a storage medium of an electronic device, where the storage medium stores a table having a plurality of data which correspond to a plurality of clusters or a plurality of files of the storage medium.

2. Description of the Prior Art

Prior art file systems, such as FAT (File Allocation Table) and NTFS (New Technology File System), are widely used by operating systems to organize data stored in a storage device. However, these well-known file systems are not suitable for many low-end embedded systems which have insufficient memory for the following reasons: first, these file systems are generally much more complex; second, the operating system needs more memory and much more time to access files in these file systems; third, these standard file systems generally lack security and it is difficult to protect their contents. Therefore, how to create a file system and a data accessing method which can save memory and access time, and can efficiently protect file contents is an important issue in the field.

SUMMARY OF THE INVENTION

It is therefore an objective of the present invention to provide a method for accessing data stored in a storage medium of an electronic device, which can save memory and access time and efficiently protect file contents, to solve the above-mentioned problems.

According to one embodiment of the present invention, a method for accessing data stored in a storage medium of an electronic device is disclosed, where the storage medium stores a file-usage table having a plurality of file-usage data which correspond to a plurality of clusters of the storage medium, respectively. The method comprises: when a file is stored into at least a specific cluster of the plurality of the clusters of the storage medium, modifying a specific file-usage data which corresponds to the specific cluster; and when the file is deleted from the storage medium, setting the specific file-usage data by a first predetermined value.

According to another embodiment of the present invention, a method for accessing data stored in a storage medium of an electronic device is disclosed, where the storage medium stores a file-index table having a plurality of file-index data which correspond to a plurality of clusters of the storage medium, respectively. The method comprises: when a file is stored into the storage medium, creating a specific file-index data which corresponds to the file, where the specific file-index data has information about a sequence number of the file; and when the file is deleted from the storage medium, setting the specific file-index data by a predetermined value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the file system overall layout of the memory shown in FIG. 1.

FIG. 4 is an exemplary diagram of the file-usage table shown in FIG. 3.

FIG. 5 is an exemplary diagram of the file-index table shown in FIG. 3.

FIG. 6 is an exemplary diagram of the file-name table shown in FIG. 3.

FIG. 7 is an exemplary diagram of the first file-property table shown in FIG. 3.

FIG. 8 is an exemplary diagram of the second file-property table shown in FIG. 3.

DETAILED DESCRIPTION

Figure 1:
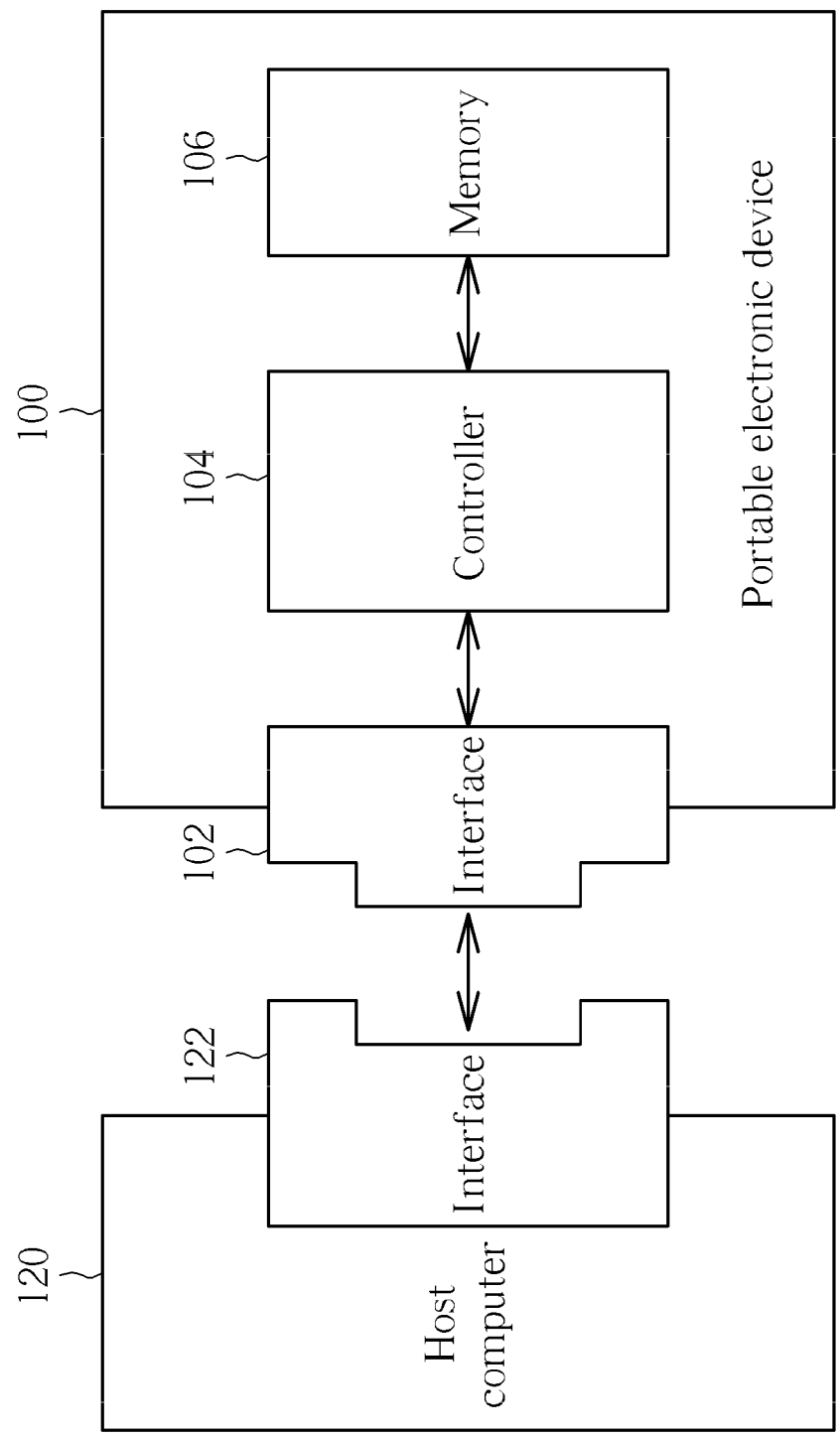
FIG. 1 is a diagram illustrating a portable electronic device according to one embodiment of the present invention.

Please refer to FIG. 1. FIG. 1 is a diagram illustrating a portable electronic device 100 according to one embodiment of the present invention. As shown in FIG. 1, the portable electronic device 100 includes an interface 102, a controller 104 and a memory 106. The interface 102 is used for electrically connecting to an interface 122 of a host computer 120. In addition, the portable electronic device 100 can be a flash memory device, a media player such as a MP3 player, a digital camera/camcorder, a cell phone, a PDA (Personal Digital Assistant), or any other portable electronic device having a storage medium.

In addition, a file system of the memory 106 is shown in FIG. 2. In FIG. 2, the memory 106 has a plurality of clusters (in this embodiment, the memory 106 has 1024 clusters), where the cluster is the smallest logical amount of memory space that can be allocated to hold a file, and the cluster Cluster_0 is used for storing a system table, and the other clusters (Cluster_1-Cluster_1023) are used for storing data created or copied from the host computer 120. Please note that the number of cluster in the memory is an example, but not a limitation.

Figure 3:
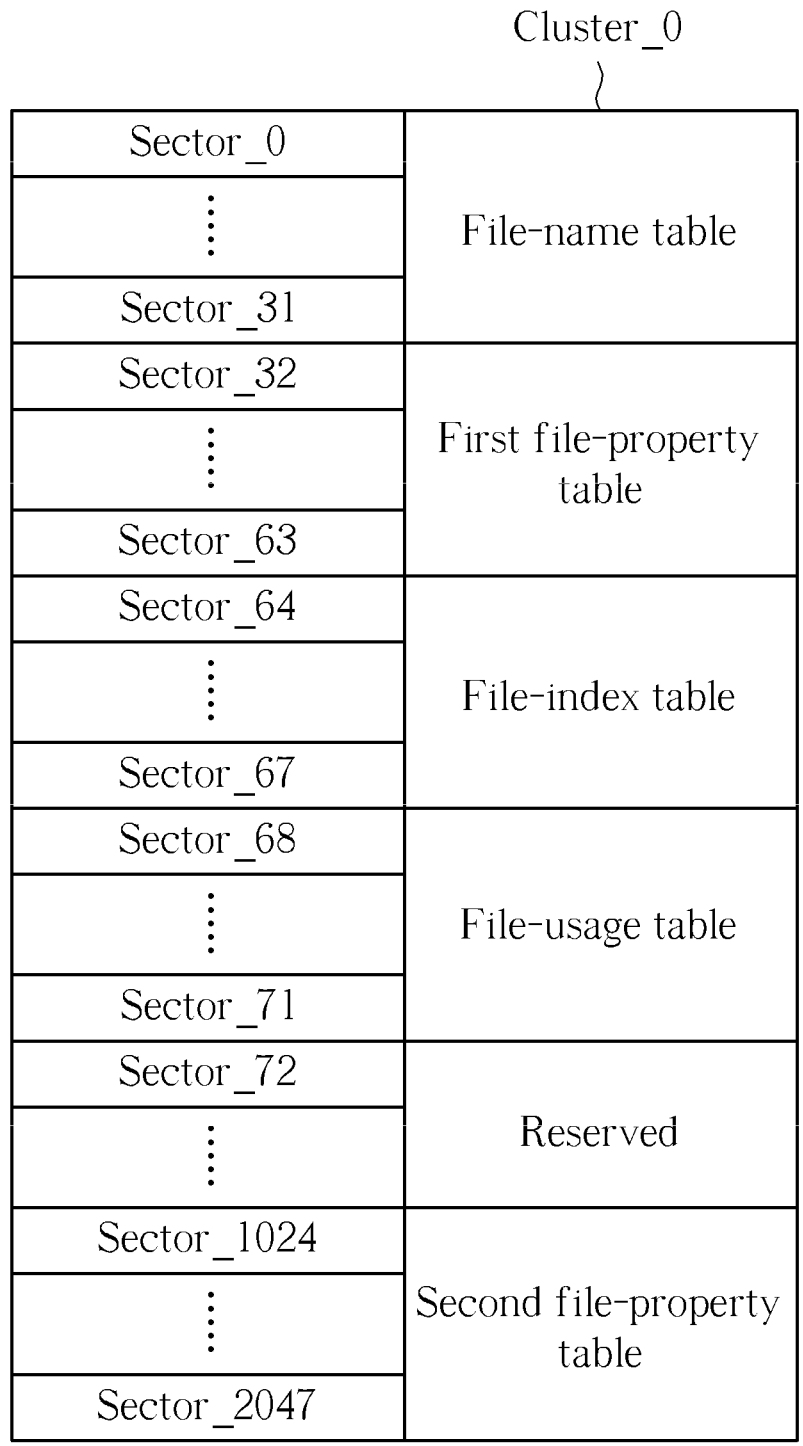
FIG. 3 is a diagram illustrating the system table structure stored in the cluster_0 shown in FIG. 2 according to one embodiment of the present invention.

Please refer to FIG. 3. FIG. 3 is a diagram illustrating the system table stored in the cluster Cluster_0 shown in FIG. 2 according to one embodiment of the present invention. As shown in FIG. 3, the cluster Cluster_0 has 2048 sectors, and the system table includes a file-name table, a first file-property table, a file-index table, a file-usage table and a second file-property table, where the file-usage table is mandatory and other tables are optional, which means that file-index table, file-name table, first file-property table and second file-property table may be ignored when it needn't them. The file-name table is stored at the sector_0-sector_31, the first file-property table is stored at the sector_32-sector_63, the file-index table is stored at the sector_64-sector_67, the file-usage table is stored at the sector_68-sector_71, and the second file-property table is stored at the sector_1024-sector_2047. Please note that the allocation(order) and occupied sector amount of the system table shown in FIG. 3 is for illustrative purposes only; in other embodiments, each of the above tables can be stored at any predetermined storage space allocated in the memory 106 and can occupy any sector amount as required.

FIGS. 4-8 are exemplary diagrams of the file-usage table, the file-index table, the file-name table, the first file-property table and the second file-property table shown in FIG. 3, respectively. Please note that, the tables shown in FIGS. 4-8 are illustrated under the assumptions that: a storage capacity of the memory 106 is 1 GB (gigabytes), the max size of a single file is 64 MB (megabytes), the memory 106 supports 1023 files, the memory 106 includes 1024 clusters and a size of each cluster is 1 MB, and each cluster includes 2048 sectors. Please note that the elements of the tables shown in FIGS. 4-8 are not meant to be limitations of the present invention. If storage capacity, max size of a single file or supported file number by memory is changed, the system table FIGS. 2-8 should be modified correspondingly.

Referring to the file-usage table shown in FIG. 3 and FIG. 4, the file-usage table is stored in four sequential sectors (sector_68-sector_71) and a size of the file-usage table is 2 KB (kilobytes). The file-usage table includes 1024 file-usage data $D_{u0}, D_{u1}, D_{u2}, D_{u3}, \ldots, D_{u1022}, D_{u1023}$, where a size of each file-usage data is 2 bytes. $D_{u0}$ is the total file number (TFN) in the memory 106 currently. In addition, the file-usage data $D_{u1}$-$D_{u1023}$ correspond to clusters Cluster_1-Cluster_1023 shown in FIG. 2, respectively, and each file-usage data records information about a file stored in its corresponding cluster, where the information about the file can be a sequence number of the file, and a sequence number of the cluster within the cluster sequence . . . etc. For example, if the cluster Cluster_3 stores a file, the file-usage data $D_{u3}$ records the information about the file stored in the cluster Cluster_3; if the cluster Cluster_4 is empty (the cluster Cluster_4 does not store a valid data), the file-usage data $D_{u4}$ is set by a predetermined value such as "FFFF".

In addition, please refer to the file-index table shown in FIG. 3 and FIG. 5, the file-index table is stored in four sequential sectors (sector_64-sector_67) and a size of the file-index table is 2 KB. The file-index table includes 1023 file-index data $D_{i1}, D_{i2}, D_{i3}, \ldots, D_{i1022}, D_{i1023}$, where a size of each file-index data is 2 bytes. $D_{i1}$ is for the 1$^{st}$ file, and $D_{i2}$ is for the 2$^{nd}$ file, etc. In addition, the file-index data correspond to a plurality of files stored in the memory 106, respectively, and each file-index data records a sequence number of its corresponding file. For example, if the memory 106 stores a first file (having a sequential number #1) and a second file (having a sequential number #2), one of the file-index data (for example, the file-index data $D_{i1}$) records a value "1" and one of the other file-index data (for example, the file-index data $D_{i2}$) stores a value "2". In addition, if there are only two files stored in the memory 106 and the file-index data $D_{i1}$ and $D_{i2}$ stores the sequence numbers of these two files, respectively, the other file-index data $D_{i3}$-$D_{i1023}$ are set by a predetermined value such as "FFFF".

In addition, please refer to the file-name table shown in FIG. 3 and FIG. 6, the file-name table is stored in 32 sequential sectors (sector_0-sector_31) and a size of the file-name table is 16 KB. The file-name table includes 1023 file-name data DFN1, DFN2, DFN3, . . . , DFN1022, DFN1023, where a size of each file-name data is 16 bytes, in which, the 1st byte is the status of the line: value "00" means this line is a valid or occupied, value "FF" means this line is invalid or empty, and the other 15 bytes are the file name content. In addition, the location (line number) of the file-name data DFN1-DFN1023 equal to the location (offset) of the file-index data Di1-Di1023, respectively, and each file-name data DFNi records a file name of the file. For example, if the file-index data Di1 stores a sequence number of the first file and the file-index data Di2 stores a sequence number of a second file, then the file-name data DFN1 records a file name of the first file, and the file-name data DFN2 records a file name of the second file.

In addition, please refer to the first file-property table shown in FIG. 3 and FIG. 7. FIG. 7 is exactly same to FIG. 6 except the table shown in FIG. 7 does not have the status byte. The first file-property table is stored in 32 sequential sectors (sector_32-sector_63) and a size of the first file-property table is 16 KB. The first file-property table includes 1023 first file-property data $D_{FFP1}, D_{FFP2}, D_{FFP3}, \ldots, D_{FFP1022}, D_{FFP1023}$, where a size of each first file-property data is 16 bytes, in which, all 16 bytes are the short properties content. In addition, the location (line number) of each of the first file-property data $D_{FFP1}$-$D_{FFP1023}$ is equal to the location (offset) of each of the file-index data $D_{i1}$-$D_{i1023}$, and each first file-property data $D_{FFPi}$ records information whose data length is shorter than a first predetermined length (in this embodiment, the first predetermined length is 16 bytes), where the information here can be a key identity (ID) which is used for decoding (decrypting) or accessing the file. For example, if the file-index data $D_{i1}$ stores a sequence number of the first file, and the file-index data $D_{i2}$ stores a sequence number of a second file, then the first file-property data $D_{FFP1}$ records the first file's information (e.g. Key ID) whose data length is shorter than 16 bytes, and the first file-property data $D_{FFP2}$ records the second file's information whose data length is shorter than 16 bytes.

In addition, please refer to the second file-property table shown in FIG. 3 and FIG. 8. FIG. 8 is mostly same to FIG. 7 except FIG. 8 uses 512-byte length instead of FIG. 7's 16-byte. The second file-property table is stored in 1024 sequential sectors (sector_1024-sector_2047) and a size of the second file-property table is 512 KB. The second file-property table includes 1023 second file-property data $D_{SFP1}, D_{SFP2}, D_{SFP3}, \ldots, D_{SFP1022}, D_{SFP1023}$, where a size of each second file-property data is 512 bytes, in which, all 512 bytes are the long properties content. In addition, the location (sector number) of each of the second file-property data $D_{SFP1}$-$D_{SFP1023}$ is equal to the location (offset) of each of the file-index data $D_{i1}$-$D_{i1023}$, and each second file-property data $D_{SFPi}$ records information whose data length is shorter than a second predetermined length (in this embodiment, the second predetermined length is 512 bytes and is longer than the first predetermined length), where the information here can be an introduction or description (such as restriction condition, play history records, subscribing log, vendor name, purchase date and number, . . . etc.) of a multimedia file. For example, if the file-index data $D_{i1}$ stores a sequence number of the first file and the file-index data $D_{i2}$ stores a sequence number of a second file, then the second file-property data $D_{SFP1}$ records the first file's information whose data length is shorter than 512 bytes, and the second file-property data $D_{SFP2}$ records the second file's information whose data length is shorter than 512 bytes.

Figure 9A:
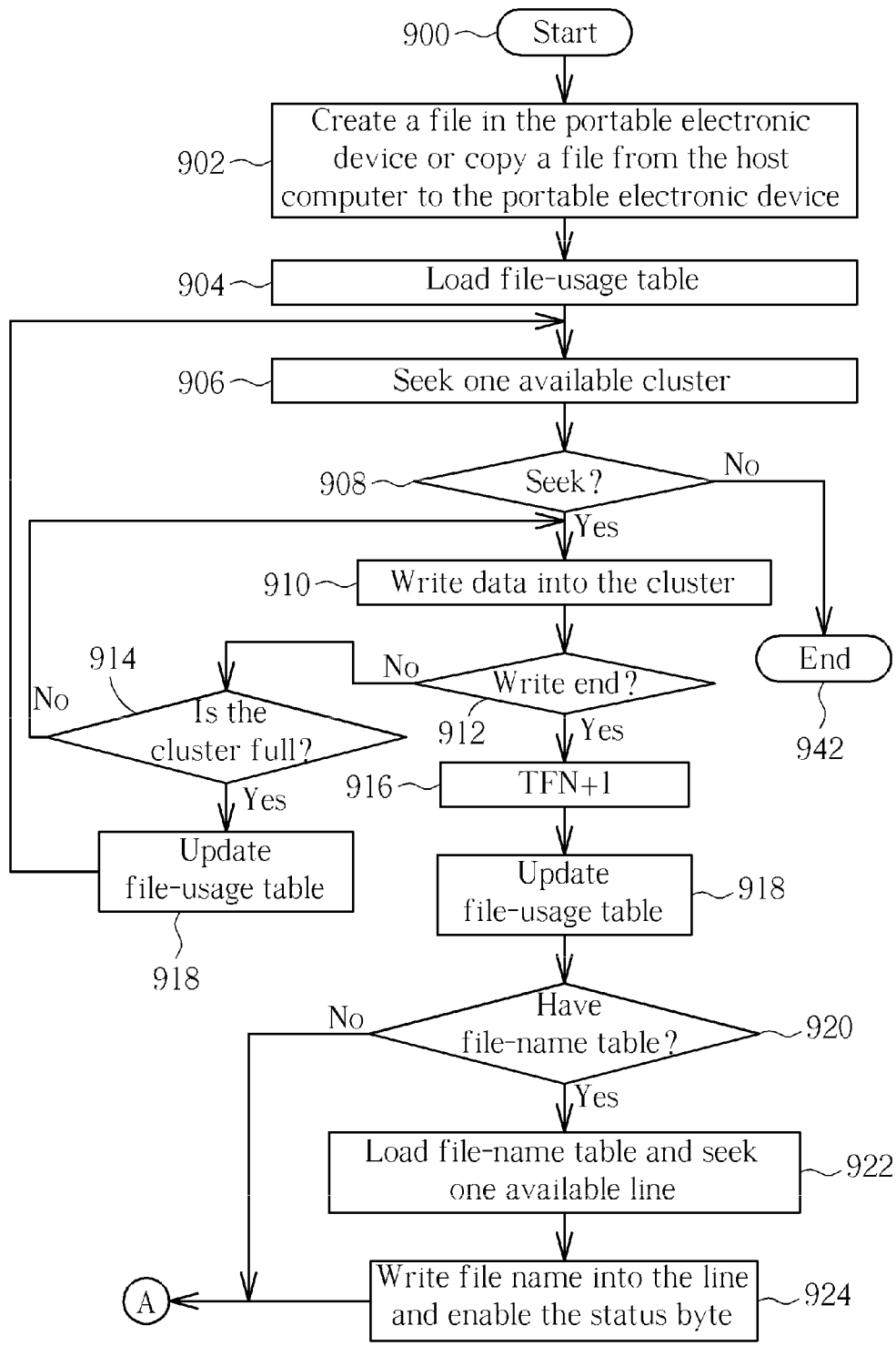
FIGS. 9A and 9B are a flowchart showing the process of writing a file into the memory of the portable electronic device according to one embodiment of the present invention.
Figure 9B:
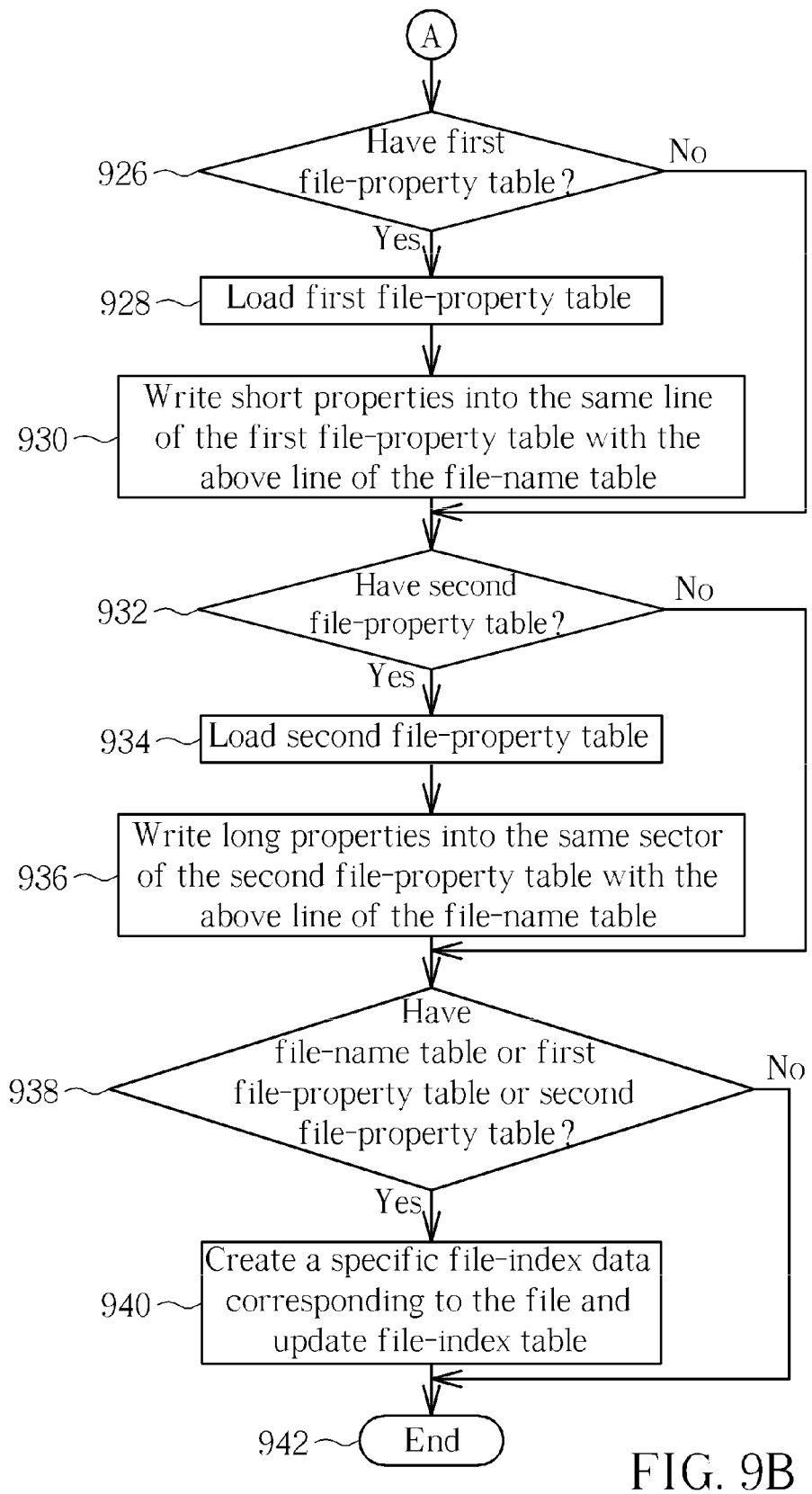

Please refer to FIGS. 9A and 9B. FIGS. 9A and 9B are a flowchart of the process of writing a file into the memory 106 of the portable electronic device 100 according to one embodiment of the present invention. Please note that, provided the result is substantially the same, the steps are not limited to be executed according to the exact order shown in FIGS. 9A and 9B. Referring to the flowchart shown in FIGS. 9A and 9B and tables shown in FIGS. 4-8, the flowchart of writing the file into the memory 106 is described as follows:

Before the flow shown in FIGS. 9A and 9B begins, the portable electronic device 100 is connected to the host computer 120 via the interfaces 102 and 122 if copying a file from the host computer 120. Then, in Step 900, the process starts. In Step 902, a file is created or copied from the host computer 120 to the portable electronic device 100, and the file is stored into at least a specific cluster of the memory 106. Then, in Step 904, the current file-usage table is loaded. To seek a new spare cluster is on doing in Step 906, in Step 908, it is to check the seek result. If there is no spare cluster found, the flow will go end of Step 942. If a new spare cluster is available, the flow will go to Step 910 to write data in the cluster. In Step 912, it is to check the writing procedure end or not. If not end, the flow will go to Step 914. If end, the flow will go to Step 916. In addition, in Step 914, it is to check whether this cluster is full or not. If not full, the flow will go to Step 910 to continue writing data. If the cluster is full, the flow will go to Step 918 to update the file-usage table and go to Step 906 to find the next new spare cluster. In Step 918, at least a specific file-usage data which corresponds to at least the specific cluster is modified to make the specific file-usage data have information about a sequence number of the file F_SN and a sequence number of the specific cluster within the cluster sequence C_SN. The sequence number of the file F_SN represents an order of the file been stored in the memory 106. For example, a file is a $6^{th}$ file stored into the memory 106 (that is, before the file is stored into the memory 106, the memory 106 already has five files), and the corresponding sequence number of the file F_SN is "6". The sequence number of the specific cluster within the cluster sequence C_SN represents an order of portions of the file. For example, the file is sequentially divided and stored into the clusters Cluster_2, Cluster_4 and Cluster_5. The first portion of the file is stored in Cluster_2, whose C_SN is 0. The second portion of the file is stored in Cluster_4, whose C_SN is 1. The third portion of the file is stored in Cluster_5, whose C_SN is 2. The sequence numbers of the specific cluster within the cluster sequence C_SN corresponding to Cluster_2, Cluster_4 and Cluster_5 represent the order of portions of the file, respectively. For more detail, assuming that each file-usage data is 2 bytes (16 bits), where bits 09 of each file-usage data are indicative of the sequence number of the file F_SN, and bits 10-15 of each file-usage data are indicative of the sequence number of the specific cluster within the cluster sequence C_SN. As stated above, the file is sequentially stored into the clusters Cluster_2, Cluster_4 and Cluster_5, then a binary code of the file-usage data $D_{u2}$ is set to be "0000 0000 0000 0110" (which can also be represented as "0x0006") which is indicative of F_SN=6 and C_SN=0; a binary code of the file-usage data $D_{u2}$ is set to be "0000 0100 0000 0110" (which can also be represented as "0x0406") which is indicative of F_SN=6 and C_SN=1; and a binary code of the file-usage data $D_{u5}$ is set to be "0000 1000 0000 0110" (which can also be represented as "0x0806") which is indicative of F_SN=6 and C_SN=2.

In Step 916, the TFN (Total File Number) increases one because file writing is done. Then, the flow will go to Step 918 to update File-Usage Table. In Step 920, it is to check whether the file system have file-name table or not. If have not, the flow will go to Step 926. If have, the flow will go to Step 922 to load current file-name table and seek one available line to store file name. In Step 924, the file name is stored into the line and the status byte is written as "00" (Valid). In Step 926, it is to check whether the file system have first file-property table. If have not, the flow will go to Step 932. If have, the flow will go to Step 928 to load current first file-property table. In Step 930, the short property data is stored into a line the first file-property table, where the line number is exactly same with the above line number of file-name table in Step 924. In Step 932, it is to check whether the file system have Second File-Property Table. If have not, the flow will go to Step 938. If have, the flow will go to Step 934 to load current second file-property table. In Step 936, the long property data is stored into a sector of the second file-property table, where the sector number is exactly same with the above line number of File-Name Table in Step 924. In Step 938, it is to check whether the file system have the file-name table or first file-property table or second file-property table. If have not, the flow will go end of Step 942. If have, the flow will go to Step 940.

In Step 940, a specific file-index data which corresponds to the file is created, where the specific file-index data has information about the sequence number of the file. For example, assuming that each file-index data is 2 bytes, and further assuming that the file is a $6^{th}$ file stored into the memory 106 (that is, before the file is stored into the memory 106, the memory 106 has five files), one of the file-index data (for example, the file-index data $D_{i6}$) is set to be "0000 0000 0000 0110" (which can also be represented as "0x0006") which represents that the file-index data $D_{i6}$ records a sequence number "6". And the file-index data $D_{i6}$'s location (offset) equals to its file-name data $D_{FN6}$'s location (line number).

In Step 924, a specific file-name data which corresponds to the specific file via its file-index data is created, where the specific file-name data has information about at least a file name of the file. For example, assuming the file is stored into the memory 106 and the file-index data $D_{i6}$ records the sequence number of the file, the file-name data $D_{FN6}$ which corresponds to the file-index data $D_{i6}$ is created to have the file name or other information of the file. In one embodiment of the present invention, referring to the 16-bytes file-name data (offset 00h-0Fh shown in FIG. 6), the byte 00h is indicative of a status (existence) of file-name data of this line (for example, when the byte 00h is "FF", the file-name data of this line does not correspond to any file stored in the memory 106; when the byte 00h is "00", this file-name data of this line corresponds to one file stored in the memory 106), the bytes 01h-0Bh are indicative of the file name of the file, and the bytes 0Ch-0Fh are indicative of an attribute or a size of the file.

In Step 930, a specific first file-property data which corresponds to the specific file via its file-index data is created, where the specific first file-property data has information having a data length shorter than the first predetermined length (such as 16 bytes in this embodiment). For example, assuming the file is stored into the memory 106 and the file-index data $D_{i6}$ records the sequence number of the file, the first file-property data $D_{FFP6}$ which corresponds to the file-index data $D_{i6}$ is created to have information having a data length shorter than 16 bytes.

In Step 936, a specific second file-property data which corresponds to the file is created, where the specific second file-property data has information having a data length shorter than the second predetermined length (such as 512 bytes in this embodiment). For example, assuming the file is stored into the memory 106 and the file-index data $D_{i6}$ records the sequence number of the file, the second file-property data $D_{SFP6}$ which corresponds to the file-index data $D_{i6}$ is created to have information having a data length shorter than 512 bytes. In step 942, the process ends.

Briefly summarizing the flow shown in FIGS. 9A and 9B, when a file is written into the cluster, its related file-usage data, file-index data, file-name data, first file-property data and second file-property data are modified to include the information of the file. For example, if the $6^{th}$ file is copied into the cluster Cluster_2, the file-usage data $D_{u2}$, one of the file-index data such as $D_{i6}$, file-name data $D_{FN6}$ which corresponds to the file-index data $D_{i6}$, first file-property data $D_{FFP6}$ which corresponds to the file-index data $D_{i6}$, and second file-property data $D_{SFP6}$ which corresponds to the file-index data $D_{i6}$ are modified to include the information of the file.

Please note that the creation or modification of the file-usage data (table) are mandatory, and the creation or modification of the file-index data (table), file-name data (table), first file-property data (table) and second file-property data (table) are optional.

Figure 10A:
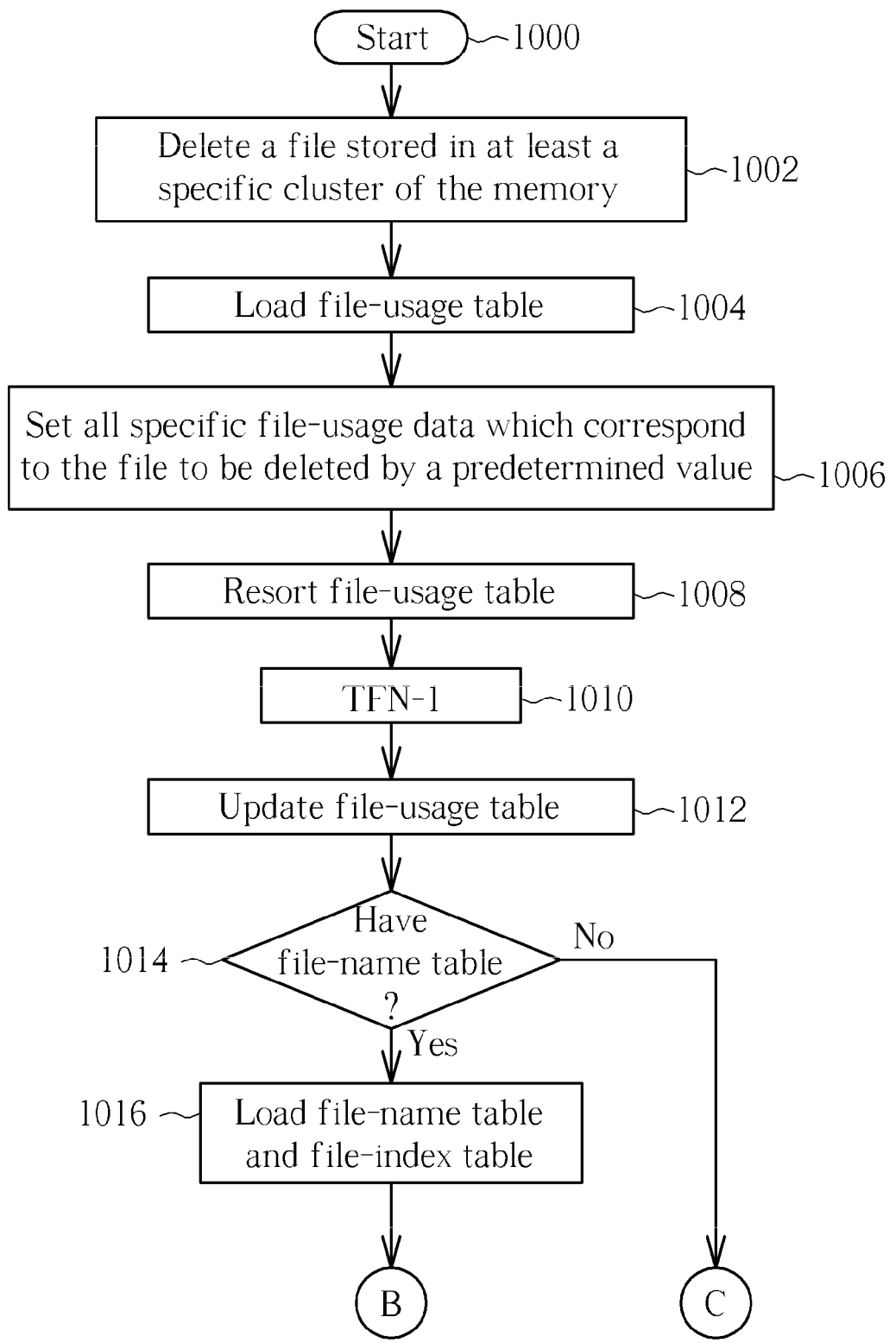
FIGS. 10A and 10B are a flowchart showing the process of deleting a file from the memory of the portable electronic device according to one embodiment of the present invention.
Figure 10B:
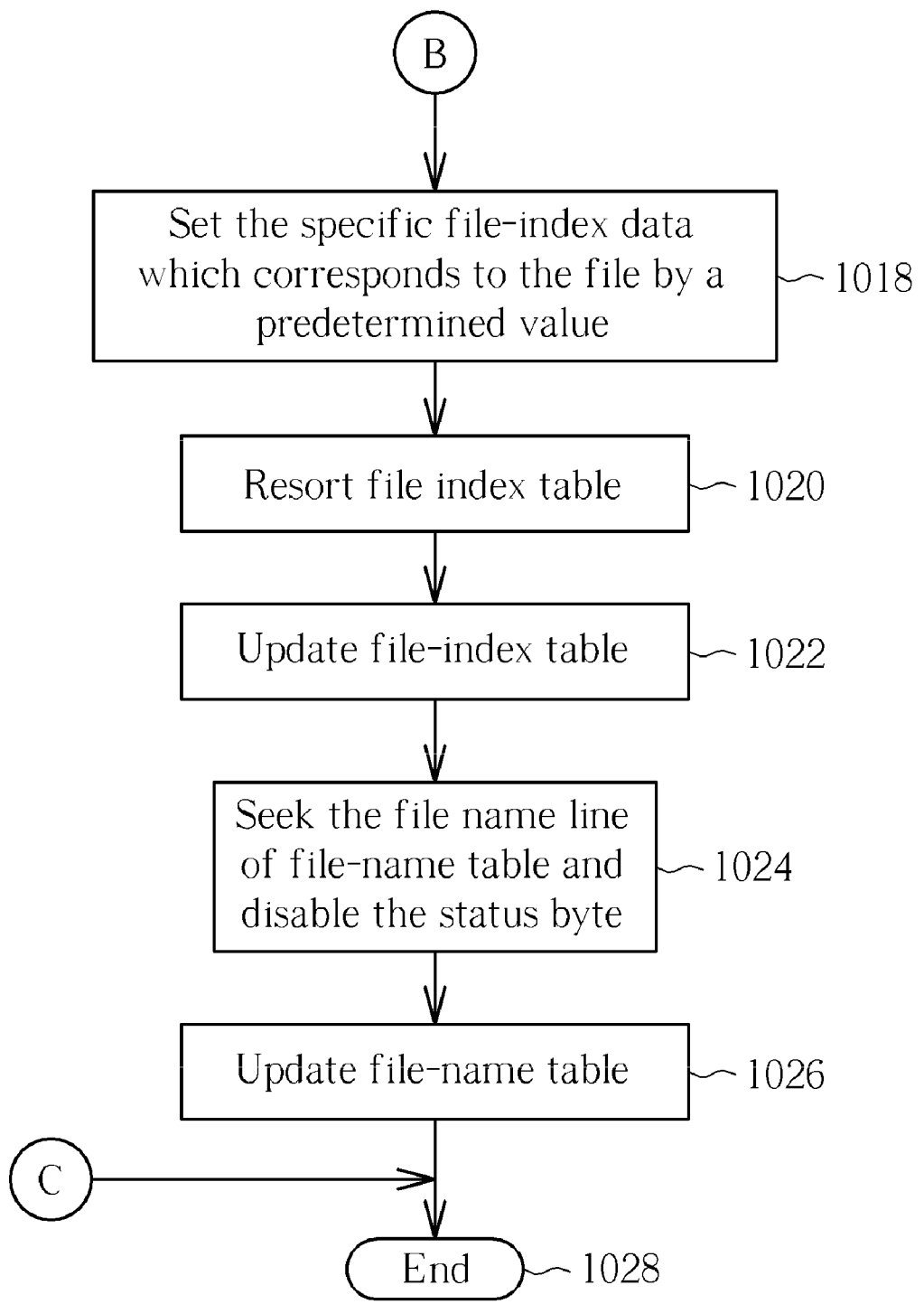

Please refer to FIGS. 10A and 10B. FIGS. 10A and 10B is a flowchart of the process of deleting the file from the memory 106 of the portable electronic device 100 according to one embodiment of the present invention. Please note that, provided the result is substantially the same, the steps are not limited to be executed according to the exact order shown in FIGS. 10A and 10B. Referring to the flowchart shown in FIGS. 10A and 10B and tables shown in FIGS. 4-8, the flowchart of deleting the file from the memory 106 is described as follows:

In Step 1000, the process starts. In Step 1002, a file stored in at least a specific cluster of the memory 106 is deleted. In Step 1004, the file-usage table is loaded. In Step 1006, all specific file-usage data which correspond to the file are set by a predetermined value such as "FFFF". For example, assuming that the file stored in the clusters Cluster_4 and Cluster_5 of the memory 106 is deleted, the file-usage data $D_{u4}$ and $D_{u5}$ are both set by the predetermined value "FFFF".

In Step 1008, at least one file-usage data of at least one remaining file stored in the memory 106 is modified to make the modified file-usage data of the remaining file have information about an updated sequence number of the remaining file. For example, assuming that the memory 106 stores a first file, a second file and a third file, the first file is stored in the cluster Cluster_1 and the file-usage data $D_{u1}$ records a sequence number "1", the second file is stored in the clusters Cluster_4 and Cluster_5 and the file-usage data $D_{u4}$ and $D_{u5}$ both record a sequence number "2", and the third file is stored in the cluster Cluster_6 and the file-usage data $D_{u6}$ records a sequence number "3". When the second file is deleted in Step 1002, the file-usage data $D_{u6}$ of the third file is updated to make the file-usage data $D_{u6}$ record an updated sequence number "2". In Step 1010, the TFN (Total File Number) decreases one. In Step 1012, the file-usage table is saved. Step 1014 is to check whether the file system has the file-name table or first file-property table or second file-property table. If all of the tables do not exist in the file system, the flow will go end of Step 1028. If have any one of the tables (e.g., the file-name table), the flow will go to Step 1016 to load the file-name table and file-index table.

In Step 1018, a specific file-index data which corresponds to the file is set by a predetermined value such as "FFFF". For example, assuming that the file stored in the memory 106 is deleted and the file-index data $D_{i2}$ records the sequence number of the file, then the file-index data $D_{i2}$ is set by the predetermined value "FFFF".

In Step 1020, at least one file-index data of at least one remaining file stored in the memory is modified to make the modified file-index data of the remaining file have information about an updated sequence number of the remaining file. For example, similar to Step 1008 and assuming that the memory 106 stores a first file, a second file and a third file, the file-index data $D_{i1}$ records a sequence number "1", the file-index data $D_{i2}$ records a sequence number "2", the file-index data $D_{i3}$ records a sequence number "3". When the second file is deleted in Step 1002, the file-index data $D_{i3}$ of the third file is updated to make the file-index data $D_{i3}$ record an updated sequence number "2". In Step 1022, the File-Index Table is saved.

In Step 1024, a part of a specific file-name data which corresponds to the deleted file (for indicating the status of the specific file-name data) is set by a predetermined value such as "FF" (Invalid). For example, assuming that the file stored in the memory 106 is deleted and the file-index data $D_{i2}$ records the sequence number of the file, the first byte of the file-name data $D_{FN2}$ which corresponds to the file-index data $D_{i2}$ is set by the predetermined value "FF" which represents that the file-name data $D_{FN2}$ does not correspond to any file. In Step 1026, the File-Name Table is saved. In step 1028, the process ends.

Briefly summarizing the flow shown in FIGS. 10A and 10B, when a file is deleted from a cluster of the memory 106, its related file-usage data, file-index data, file-name data are modified, accordingly. For example, if a file is deleted from the cluster Cluster_4, the file-usage data $D_{u4}$, one of the file-index data such as $D_{i3}$, a part of the file-name data $D_{FN3}$ which corresponds to the file-index data $D_{i3}$ are set by a predetermined value.

In addition, the file-name table, the first file-property table, the file-index table and the second file-property table shown in FIG. 3 are optional tables. That is, one or more of these optional tables can be removed from the system table without influencing the operations of the portable electronic device 100. For example, in one embodiment of the present invention, the system table includes only the file-usage table, and the Steps 920-940 and the Steps 1014-1026 therefore can be removed from the flows shown in FIGS. 9A and 9B and FIGS. 10A and 10B, respectively. In another embodiment of the present invention, the system table includes the file-usage table, the file-index table and the file-name table, and the Steps 926-936 therefore can be removed from the flows shown in FIGS. 9A and 9B, respectively.

In addition, in the above descriptions, the system table is built in the memory 106 of the portable electronic device 100. In other embodiments of the present invention, however, the system table shown in FIG. 3 can be built in any storage medium of an electronic device. This alternative design should fall within the scope of the present invention.

In an embodiment, a method for reading a file established with the above method is illustrated. When the host computer 120 wants to read a file that is the $3^{rd}$ file been stored in the memory 106, the controller 104 searches all the file-usage data in the file-usage table to find out one or more particular file-usage data whose sequence number of the file F_SN is recorded as 3. Please note that since the file-usage table is very small (about 2 kByte), searching the entire file-usage table wastes only a few time. For example, the file-usage data $D_{u10}$ and $D_{u20}$ are found, which represents that the content of file is divided in two parts and stored in cluster 10 and 20.

For identifying first and second part of the file, the controller 104 retrieves the sequence number of the specific cluster within the cluster sequence C_SN recorded in cluster 10 and 20, respectively. In one embodiment, the C_SN of the cluster 20 is 0, and the C_SN of the cluster 10 is 1. Thus, the controller 104 realizes that the cluster 20 is the first part of the file, and the cluster 10 is the second part of the file. Thus, the controller 104 can retrieve the file successfully.

In addition, the controller 104 further searches all the file-index data in the file-index table to find out particular file-index data which has the information "3". For example, assuming that the file-index data $D_{i3}$ at a determined position has the information "3" which represents that the $3^{rd}$ file's file name or first file-property or second file-property been stored in the memory 106, then, while the host computer 120 requires other information of the file (e.g. file name and file property, etc.), the controller 104 may retrieve the information in a very short time. Since the index of the file is known (e.g. "3"), the controller 104 can retrieve the file-name data $D_{FN3}$ stored at a same position for the file name without searching or using a linking relationship. Similarly, the first and second file-property of the file can also be retrieved in a very short time.

Briefly summarizing the data accessing method of the present invention, the system table is stored at a predetermined storage space allocated in the storage medium, and the system table includes the file-usage table, the file-index table, the file-name table, the first file-property table and the second file-property table for storing the information of the file. The file system and the data accessing method of the present invention are much simpler than the prior art file system such as NTFS and FAT, and the data accessing method of the present invention needs less memory and data access time. In addition, this non-standard file system and data accessing method can efficiently protect the contents of the storage medium.

Those skilled in the art will readily observe that numerous modifications and alterations of the device and method may be made while retaining the teachings of the invention.

What is claimed is:

1. A method for accessing data stored in a storage medium of an electronic device, the storage medium storing a file-usage table having a plurality of file-usage data which correspond to a plurality of clusters of the storage medium, and each the file-usage data has information about a sequence number of each stored file respectively, the method comprising:
    storing a file into at least a specific cluster of the plurality of the clusters of the storage medium;
    modifying a specific file-usage data which corresponds to the specific cluster; and
    when the file is deleted from the storage medium, modifying the specific file-usage data to make the modified file-usage data have information about an updated sequence number.

2. The method of claim 1, further comprising,
    when the file is deleted from the storage medium, setting the specific file-usage data by a first predetermined value.

3. The method of claim 1, wherein the step of modifying the specific file-usage data which corresponds to the specific cluster comprises:
    modifying the specific file-usage data to make the specific file-usage data have information about a sequence number of the specific cluster within the cluster sequence.

4. The method of claim 1, wherein the step of modifying the specific file-usage data which corresponds to the specific cluster comprises:
    modifying the specific file-usage data to make the specific file-usage data have information about a sequence number of the file.

5. The method of claim 1, wherein the file-usage table is stored at a predetermined storage space allocated in the storage medium.

6. The method of claim 1, wherein the storage medium further stores a file-index table having a plurality of file-index data which correspond to information of a plurality of files stored in the storage medium, respectively, and the method further comprises:
    when information of the file is stored into the storage medium, creating a specific file-index data which corresponds to the file, where the specific file-index data has information about a sequence number of the file; and
    when the file is deleted from the storage medium, setting the specific file-index data by a second predetermined value.

7. The method of claim 6, further comprising:
    when the file is deleted from the storage medium, modifying at least one file-index data of at least one remaining file stored in the storage medium to make the modified file-index data of the remaining file have information about an updated sequence number of the remaining file.

8. The method of claim 7, further comprising:
    when the file is deleted from the storage medium, modifying at least a file-usage data which corresponds to at least a cluster storing the remaining file to make the modified file usage data have information about an updated sequence number of the remaining file.

9. The method of claim 6, wherein the file-index table is stored at a predetermined storage space allocated in the storage medium.

10. The method of claim 6, wherein the storage medium further stores a file-name table having a plurality of file-name data which correspond to the plurality of file-index data, respectively, and the method further comprises:
    when the file is stored into the storage medium, creating a specific file-name data which corresponds to the specific file-index data, where the specific file-name data has information about a file name of the file; and
    when the file is deleted from the storage medium, setting at least a part of the specific file-name data by a third predetermined value.

11. The method of claim 10, wherein the specific file-name data further has information about an attribute of the file.

12. The method of claim 10, wherein the file-name table is stored at a predetermined storage space allocated in the storage medium.

13. The method of claim 6, wherein the storage medium further stores a first file-property table having a plurality of first file-property data which correspond to the plurality of file-index data, respectively, and the method further comprises:
    when the file is stored into the storage medium, creating a specific first file-property data which corresponds to the specific file-index data, where the specific first file-property data has information whose data length is shorter than a first predetermined length; and
    when the file is deleted from the storage medium, setting at least a part of the specific first file-property data by a fourth predetermined value.

14. The method of claim 13, wherein the specific first file-property data has information about a key identity (ID) which is utilized for accessing the file.

15. The method of claim 14, wherein the file is a multimedia file, and the specific second file-property data has information about an introduction of the multimedia file.

16. The method of claim 13, wherein the first file-property table is stored at a predetermined storage space allocated in the storage medium.

17. The method of claim 13, wherein the storage medium further stores a second file-property table having a plurality of second file-property data which correspond to the plurality of file-index data, respectively, and the method further comprises:
    when the file is stored into the storage medium, creating a specific second file-property data which corresponds to the specific file-index data, where the specific second file-property data has information whose data length is shorter than a second predetermined length, and the first predetermined length is shorter than the second predetermined length; and when the file is deleted from the storage medium, setting at least a part of the specific second file-property data by a fourth predetermined value.

18. The method of claim 17, wherein the second file-property table is positioned at a predetermined storage space allocated in the storage medium.

19. A method for accessing data stored in a storage medium of an electronic device, the storage medium storing a file-index table having a plurality of file-index data which correspond to a plurality of files stored in the storage medium, respectively, the method comprising:

when a file is stored into the storage medium, creating a specific file-index data which corresponds to the file, where the specific file-index data has information about a sequence number of the file; and when the file is deleted from the storage medium, modifying the specific file-index data by a predetermined value to make the modified file-usage data have information about an updated sequence number.

20. The method of claim 19, wherein the file-index table is positioned at a predetermined storage space allocated in the storage medium.

21. A method for reading a file stored in a storage medium of an electronic device, the storage medium storing a file-usage table having a plurality of file-usage data which correspond to a plurality of clusters of the storage medium, respectively, the file is the $N^{th}$ file been stored in the storage medium, the method comprising:

searching the file-usage table to find out one or more particular file-usage data which has information about a sequence number N;

retrieving the file at a particular cluster which corresponds to the particular file-usage data; and when the file is deleted from the storage medium, modifying the specific file-usage data to make the modified file-usage data have information about an updated sequence number.

22. The method of claim 21, wherein the storage medium further stores a file-index table having a plurality of file-index data which correspond to a plurality of files stored in the storage medium, respectively, and the method further comprises:

searching the file-index table to find out a particular file-index data which has information about the sequence number N.

* * * * *